United States Patent [19]

Davis

[11] 4,419,495

[45] Dec. 6, 1983

[54] EPOXY RESIN POWDER COATINGS HAVING LOW GLOSS

[75] Inventor: Rhetta Q. Davis, Lake Jackson, Tex.

[73] Assignee: The Dow Chemical Company, Midland, Mich.

[21] Appl. No.: 410,728

[22] Filed: Aug. 23, 1982

Related U.S. Application Data

[63] Continuation-in-part of Ser. No. 303,792, Sep. 21, 1981, abandoned, which is a continuation-in-part of Ser. No. 166,230, Jul. 7, 1980, abandoned.

[51] Int. Cl.$^3$ .............................................. C08L 63/00
[52] U.S. Cl. ................................... 525/109; 525/110; 525/111; 525/113; 525/119; 525/934
[58] Field of Search ............... 525/109, 110, 111, 113, 525/119, 934

[56] References Cited

U.S. PATENT DOCUMENTS

| | | | |
|---|---|---|---|
| 3,201,374 | 8/1965 | Simms | 525/119 |
| 3,652,723 | 3/1972 | Fellers | 525/934 |
| 3,678,130 | 7/1972 | Klapprott | 525/109 |
| 3,678,131 | 7/1972 | Klapprott | 525/109 |
| 3,758,633 | 9/1973 | Labana | 525/934 |
| 3,954,898 | 5/1976 | Hirota | 525/934 |
| 4,009,223 | 2/1977 | Noonan | 525/934 |
| 4,246,368 | 1/1981 | Murase | 525/934 |

*Primary Examiner*—Paul Lieberman
*Attorney, Agent, or Firm*—J. G. Carter

[57] ABSTRACT

The gloss of epoxy resin powder coatings is reduced by employing as the curing agent therefor or as a portion of the curing agent therefor, a polymer of two or more polymerizable ethylenically unsaturated monomers, at least one of which contains a group which is reactive with a vicinal epoxy group.

12 Claims, No Drawings

EPOXY RESIN POWDER COATINGS HAVING LOW GLOSS

CROSS-REFERENCE TO RELATED APPLICATIONS

This application is a continuation-in-part of application Ser. No. 303,792 filed Sept. 21, 1981 which is a continuation-in-part of application Ser. No. 166,230 filed July 7, 1980 (now both abandoned).

BACKGROUND OF THE INVENTION

FORMULA I

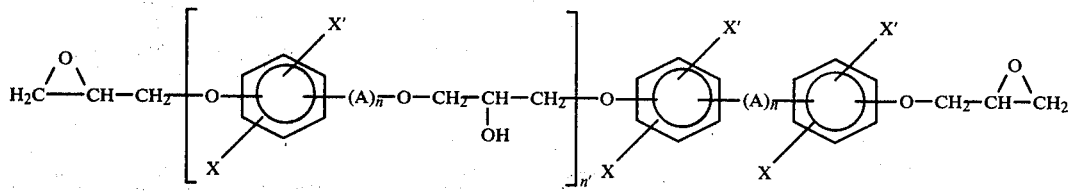

FORMULA II

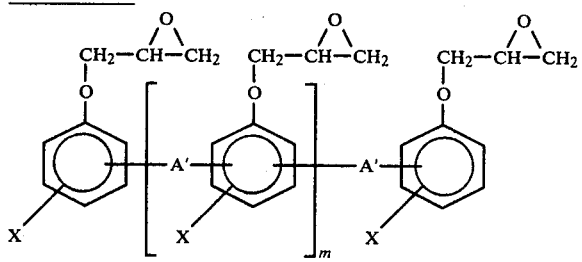

Epoxy resin coatings generally have high gloss properties. In some applications, it is desirable to have coatings with low gloss.

The present invention provides a method for lowering the gloss of epoxy resin powder coating.

SUMMARY OF THE INVENTION

The present invention pertains to an improvement in epoxy resin powder coatings wherein the improvement resides in the use of, as at least part of the curing agent therein, a polymer prepared by polymerizing two or more polymerizable ethylenically unsaturated monomers at least one of which contains a group reactive with a vicinal epoxide group such that the resultant polymer contains a plurality of groups reactive with a vicinal epoxy group and has a melt index of from about 30 to about 40,825, preferably from about 250 to about 2000.

The present invention also pertains to a powder coating composition comprising (A) at least one solid epoxy resin or a mixture of epoxy resins which mixture is a solid;

(B) a material containing more than one phenolic hydroxyl group;

(C) a sufficient quantity of a polymer having a plurality of groups reactive with the epoxy groups of component (A) and a melt index of from about 30 to about 40,825, preferably from about 250 to about 2000, said polymer being present in a quantity sufficient to lower the 60° gloss of said coating when cured; and (D) a catalyst or accelerator for the reaction of component (A) with components (B) or (C) or both; wherein component (A), (B) and (C) are present in quantities which provides a ratio of equivalents of component (A) to the equivalents of component (B) plus component (C) of from about 0.8:1 to about 1.2:1, preferably from about 0.9:1 to about 1.1:1.

DESCRIPTION OF THE PREFERRED EMBODIMENTS

The epoxy resins employed in the present invention include the glycidyl ethers of polyhydric phenolic compounds such as, for example, those represented by the following formulae:

wherein each A is independently a divalent hydrocarbyl group having from 1 to about 8 carbon atoms, —S—, —S—S—, —O—,

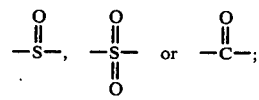

each n independently has a value of zero or 1; n' has a value such that the epoxy resin is a solid at 25° C.; each A' is independently a divalent hydrocarbyl group having from 1 to about 6 carbon atoms and m has a value such that the epoxy resin is a solid at 25° C.; each X and X' is independently hydrogen, a halogen atom or a hydrocarbyl group having from 1 to about 9 carbon atoms.

Particularly suitable epoxy resins are the diglycidyl ethers of a bisphenol, particularly bisphenol A, and the glycidyl ethers of novolac resins, particularly the glycidyl ethers of phenol-formaldehyde novolac resins, e.g. those epoxy resins of formula (II) wherein A' is a methylene group.

When a halogenated epoxy resin is employed, the halogen atoms are usually chlorine and/or bromine, preferably bromine.

Also suitable as epoxy resins are blends of liquid epoxy resins and solid epoxy resins wherein the resultant blend is a solid at about 25° C.

Suitable curing agents which can be employed herein include, for example, substituted guanidines such as, for example, dicyandiamide, derivatives of biguanides such as, for example, o-toluyl-biguanide, aliphatic amines such as, for example, ethylene diamine, diethylenetriamine, triethylenetetramine, tetraethylenepentamine, aromatic amines such as, for example, methylene dianiline, meta-phenylene diamine, diaminodiphenylsulfone, phenolic hydroxyl-containing compounds, polycarboxylic acids, mixtures thereof and the like.

Also suitable as curing agents are halogenated anhydrides such as chlorendic anhydride, and non-halogenated anhydrides such as pyromellitic dianhydride, tetra or hexahydrophthalic anhydride, etc.

Suitable materials containing more than one phenolic hydroxyl group which can be employed as the curing agent herein include, for example, catechol, hydroquinone, resorcinol, and those represented by the formulae value of from zero to about 10; and each y independently has a value of from zero to 1.

Particularly suitable curing agents are the phenolic hydroxyl-containing compounds represented by formula (III) wherein A is an isopropylidine group and each n has a value of 1 and each X and X' is hydrogen or bromine, preferably hydrogen.

Suitable gloss control additives which can be employed herein include polymers of α-olefins or other ethylenically unsaturated monomers and at least one other monomer polymerizable therewith provided that one of said monomers contain a group which is reactive with a vicinal epoxy group. Particularly suitable are the polymers prepared from ethylene and acrylic acid or methacrylic acid. Other suitable thermoplastic polymers include those prepared from styrene and acrylic or

FORMULA III

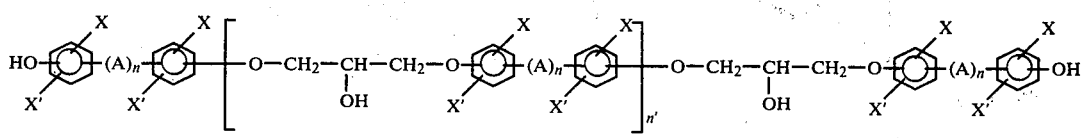

FORMULA IV

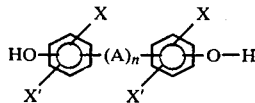

FORMULA V

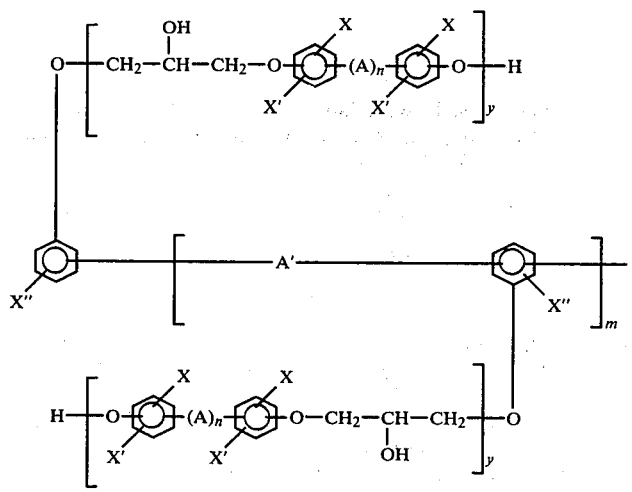

wherein each A is independently a divalent hydrocarbyl group having from 1 to about 8 carbon atoms, —S—, —S—S—, —O—,

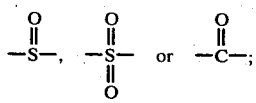

each X, X' and X" is independently hydrogen, a hydrocarbyl group having from 1 to about 9 carbon atoms, chlorine or bromine; each A' is independently a divalent hydrocarbyl group having from 1 to about 6 carbon atoms; each m has a value of from about 0.01 to about 6, preferably from about 0.01 to about 3; n' has an average methacrylic acid or from styrene and acrylonitrile where the labile tertiary hydrogen resulting from the copolymerization is reactive with an epoxy resin group.

The gloss control additive should flow well enough to make molecular contact with other components of the formulation at a temperature not in excess of about 225°–250° C. and preferably below about 205° C. Particularly suitable such polymers are those which have a melt index at 190° C. in the range of from about 30 to about 40,825, preferably from about 250 to about 2000 as determined by using an extrusion plastometer. The melt index is the weight in grams of polymer that extrudes through an 0.0825 inch orifice in 10 minutes with an applied weight of 2.16 kg.

The gloss control agent can suitably be employed in quantities of from about 0.025 equivalent to about 1.2 equivalents per equivalent of epoxy resin. The actual quantity being that which will provide a decrease in the 60° gloss value of the resultant coating and meet the requirements of the ratio of epoxy equivalent to the combined equivalent value of the gloss control additive and the curing agent of from about 0.8:1 to about 1.1:1, preferably from about 0.9:1 to about 1.1:1.

When the curing agent for the epoxy resin is a phenolic-hydroxyl-containing material, a catalyst or accelerator is desired to promote the reaction between the epoxy resin and the phenolic hydroxyl group. These catalysts and curing agents are also useful in promoting the reaction between the epoxy resin and the gloss control additive.

Suitable catalysts for the reaction between the epoxy resin and the phenolic-hydroxyl-containing material include those disclosed in U.S. Pat. Nos. 3,931,109; 3,948,855; and 3,477,990 which are incorporated herein by reference.

Particularly suitable catalysts or accelerators are 2-methyl imidazole or triphenylphosphine.

The powder coating compositions of the present invention can also contain other components such as, for example, flow control agents, pigments, dyes, fillers and the like.

The following examples are illustrative of the present invention, but are not to be construed as to limit the scope thereof in any manner.

The following components were employed in the examples and comparative experiments.

EPOXY RESIN I is a solid epoxy resin prepared from bisphenol A and a liquid diglycidyl ether of bisphenol A, said solid epoxy resin having an average EEW of about 525.

EPOXY RESIN II is a solid epoxy resin prepared from bisphenol A and a liquid diglycidyl ether of bisphenol A, said solid epoxy resin having an average EEW of about 640.

EPOXY RESIN III is a solid epoxy resin prepared from bisphenol A and a liquid diglycidyl ether of bisphenol A, said solid epoxy resin having an average EEW of about 770.

EPOXY RESIN IV is a solid epoxy resin prepared from bisphenol A and a liquid diglycidyl ether of bisphenol A, said solid epoxy resin having an average EEW of about 925.

EPOXY RESIN V is a phenol-folmaldehyde novolac epoxy resin having an average EEW of 176–181 and an average functionality of about 3.5.

EPOXY RESIN VI is a blend of EPOXY RESINS IV AND V in an epoxy equivalent ratio of 1.25 eq. of V per 1.0 eq. of IV. The mixture has an average EEW of 500–575.

EPOXY RESIN VII is a mixture of 95 weight percent of a solid epoxy resin having an average EEW of about 703 prepared from bisphenol A and a liquid diglycidyl ether of bisphenol A and 5 weight percent Modaflow ®, a flow control agent sold by the Monsanto Company, having an average EEW of about 740.

EPOXY RESIN VIII is a solid epoxy resin prepared from bisphenol A and a liquid diglycidyl ether of bisphenol A, said solid epoxy resin having an average EEW of about 1800.

CURING AGENT A is the reaction product of bisphenol A with a liquid diglycidyl ether of bisphenol A having an EEW of about 182–190 in an equivalent ratio of 3 to 1 respectively, said reaction product having a phenolic hydroxyl equivalent weight of about 235.

CURING AGENT B is a phenol-formaldehyde novolac resin having an average functionality of about 5.5 and the phenolic hydroxyl equivalent weight of about 107 and is commercially available from Union Carbide Corp. as BRWE 5555.

CURING AGENT C is an acid functional polyester prepared from terephthalic acid, isophthalic acid and neopentyl glycol having an acid equivalent weight of about 830 and is commercially available from Urac-Chem International, Netherlands as Scado P-2230.

CURING AGENT D is dicyandiamide.

CURING AGENT E is 82% dicyanidamide, 17% 2-methylimidazole and 1% fumed silica.

GLOSS CONTROL ADDITIVE A is a copolymer of ethylene and acrylic acid containing about 19.3 percent acrylic acid and melt index of from about 250 to about 350 at 190° C. and an acid equivalent weight of about 373.

GLOSS CONTROL ADDITIVE B is a polymer prepared from 39.5 parts by weight (pbw) butyl acrylate, 22.3 pbw methylmethacrylate, 22.3 pbw styrene and 15.9 pbw methacrylic acid having an acid equivalent of about 680.

GLOSS CONTROL ADDITIVE C is an ethylene-acrylic acid copolymer which contains 14.78 percent by weight acrylic acid, has an acid equivalent weight of 487 and a melt index at 190° C. of 412.

GLOSS CONTROL ADDITIVE D is an ethylene-acrylic acid copolymer which contains 17.95 percent by weight acrylic acid, has an acid equivalent weight of 401 and a melt index at 190° C. of 274.

GLOSS CONTROL ADDITIVE E is an ethylene-acrylic acid copolymer which contains 19.1 percent by weight acrylic acid, has an acid equivalent weight of 377 and a melt index at 190° C. of 490.

GLOSS CONTROL ADDITIVE F is an ethylene-acrylic acid copolymer which contains 22.3 percent by weight acrylic acid, has an acid equivalent weight of 323 and a melt index at 190° C. of 308.

GLOSS CONTROL ADDITIVE G is an ethylene-acrylic acid copolymer which contains 26.6 percent by weight acrylic acid, has an acid equivalent weight of 271 and a melt index at 190° C. of 426.

GLOSS CONTROL ADDITIVE H is an ethylene-acrylic acid copolymer which contains 5.17 percent by weight acrylic acid, has an acid equivalent weight of 1393 and a melt index at 190° C. of 40,822.

GLOSS CONTROL ADDITIVE I is an ethylene-acrylic acid copolymer which contains 24.5 percent by weight acrylic acid, has an acid equivalent weight of 294 and a melt index at 190° C. of 1561.

GLOSS CONTROL ADDITIVE J is an ethylene-acrylic acid copolymer which contains 18.97 percent by weight acrylic acid, has an acid equivalent weight of 380 and a melt index at 190° C. of 1216.

GLOSS CONTROL ADDITIVE K is an ethylene-acrylic acid copolymer which contains 9.65 percent by weight acrylic acid, has an acid equivalent weight of 746 and a melt index at 190° C. of 178.

GLOSS CONTROL ADDITIVE L is an ethylene-acrylic acid copolymer which contains 21.13 percent by weight acrylic acid, has an acid equivalent weight of 341 and a melt index at 190° C. of 286.

Specular gloss retention values were measured relative to Gardner gloss standards using 20° and 60° Gardner glossmeters.

The yellowness index was measured using a Gardner Tristimulus Colorimeter.

The Reverse Impact was obtained by using a Gardner impact tester. In this test, a cylindrical weight with a spherical extrusion at one end is dropped through a guide tube onto the specimen. For reverse impact, the uncoated side of the panel is the contact side for testing. By gradually increasing the distance of fall of the weight, the point at which failure (cracking of the coated side) occurs can be determined. Results are reported in inch-pounds as the highest level that just passes the test.

The resistance to methyl ethyl ketone was obtained by rubbing the coating with a 2-pound ballpein hammer where the hammer head was covered with gauze and saturated with methylethylketone. Any marring of the coating was noted. A double rub is one set of push-pull strokes.

The resistance to water boil was determined by immersion of the coated panel into boiling water for thirty minutes. The coated panels were dried, scribed, and tested immediately for retention of adhesion using Scotch tape No. 610. The coatings were visually inspected for discoloration or blush resulting from contact with the boiling water.

The gel time was determined by mixing about a gram sample of the powder formulation with a narrow wooden spatula on a hot plate platen set at 175° C. until the material does not pick up on the spatula or becomes "tack-free".

In the following examples the powder coating formulations were melt mixed on a two-roll mill to give a homogeneous mixture. The molten ribbon was pulled from the mill, cooled, and broken into small pieces which were pulverized using an Alpine grinder. The powder was sieved using a 200-mesh screen and particles of 75 microns or less were retained. The powder was electrostatically sprayed onto cold rolled steel panels which were then heat cured.

All of the examples were cured at 175° C. for 15 minutes.

An additional cure of 15 minutes at 200° C. was made prior to testing for examples.

The formulations and properties are given in the following Table.

| FORMULATION | EXAMPLE OR COMPARATIVE EXPERIMENT NUMBER | | | | | | |
|---|---|---|---|---|---|---|---|
| | EX. 1 | EX. 2 | EX. 3 | EX. 4 | C.E.A. | EX. 5 | EX. 6 |
| Epoxy resin Type/pbw[1] | VI/152.1 VII/54 | VI/156.4 VII/54 | VI/157.9 VII/54 | VI/158.7 VII/54 | VI/159.4 VII/54 | III/147.8 VII/54 | III/168.8 VII/54 |
| Curing Agent Type/pbw | A/65.54 | A/77.9 | A82.2 | A/84.4 | A/86.6 | None | A/50.5 |
| Gloss Control Additive Type/pbw | A/28.34 | A/11.7 | A/5.9 | A/3.0 | None | A/98.2 | A/26.7 |
| Equiv. Ratio[5] | 1:1 | 1:1 | 1:1 | 1:1 | 1:1 | 1:1 | 1:1 |
| E/C/G[6] | 1/.75/.25 | 1/.9/.1 | 1/.95/.05 | 1/.975/.025 | 1/1/0 | 1/0/1 | 1/.5/.5 |
| 2-methyl-imidalole, pbw | 0.9 | 0.9 | 0.9 | 0.9 | 0.9 | 0.9 | 1.5 |
| TiO$_2$, pbw | 150 | 150 | 150 | 150 | 150 | 150 | 150 |
| Gel Time[4], sec. | N.D.[2] | N.D. | N.D. | N.D. | N.D. | N.D. | N.D. |
| Gloss Retention % @ 20°/% @ 60° | 2/5 | 2/12 | 5/34 | 35/88 | 74/100+ | 3/6 | 4/23 |
| Yellowness Index | 11.1 | 11.1 | 10.2 | 8.6 | 9.0 | 10.3 | 8.3 |
| MEK Resistance No. of Double Rubs | N.D. | N.D. | N.D. | N.D. | N.D. | 60 | 40 |
| 30 Min. Water Boil Resist. | EXC. | EXC. | EXC. | EXC. | EXC. | N.D. | N.D. |
| Reverse Impact Inch-Pounds | N.D. | N.D. | N.D. | N.D. | N.D. | p5[3] | p100 |

| FORMULATION | EXAMPLE OR COMPARATIVE EXPERIMENT NUMBER | | | | | | |
|---|---|---|---|---|---|---|---|
| | EX. 7 | EX. 8 | EX. 9 | EX. 10 | EX. 11 | EX. 12 | EX. 13 |
| Epoxy Resin Type pbw[1] | III/180.6 VII/54 | III/192.7 VII/54 | III/115.19 VII/54 | VI/152.1 VII/54 | VI/89.04 VII/54 | III/53 VII/27 | III/67.54 VII/27 |
| Curing Agent Type/pbw | B/19.1 | D/3.9 | C/90.25 | A/65.4 | C/123.78 | None | A/41.24 |
| Gloss Control Additive Type/pbw | A/46.3 | A/49.4 | A/40.56 | A/28.34 | A/33.18 | B/70 | B/14.24 |
| Equiv. Ratio[5] | 1:1 | 1:1 | 1:1 | 1:1 | 1:1 | 1.003:1 | 1.006:1 |
| E/C/G[6] | 1/.5/.5 | 1/.5/.5 | 1/.5/.5 | 1/.75/.25 | 1/.5/.5 | 1.003/0/1 | 1.006/.5/.5 |
| 2-methyl-imidalole, pbw | 0.9 | 0.9 | 1.5 | 1.5 | 1.5 | 0.5 | 0.5 |
| TiO$_2$, pbw | 150 | 150 | 150 | 150 | 150 | 75 | 75 |
| Gel Time[4], sec. | N.D. | N.D. | N.D. | N.D. | N.D. | 26.4 | 32.6 |
| Gloss Retention % @ 20°/% @ 60° | 2/6 | 2/6 | 3/21 | 8/41 | 4/23 | 3/17 | 3/8 |
| Yellowness Index | 21.9 | 8.3 | 9.7 | 9.3 | 13.3 | 5.3 | 8.6 |
| MEK Resistance No. of Double Rubs | N.D. | N.D. | 15 | 3 | 30 | N.D. | N.D. |
| 30 Min. Water Boil Resist. | N.D. | N.D. | N.D. | N.D. | N.D. | N.D. | N.D. |
| Reverse Impact Inch-Pounds | p40 | p40 | p100 | p5 | p140 | p40 | p20 |

EXAMPLE OR COMPARATIVE EXPERIMENT NUMBER

-continued

| FORMULATION | EX. 14 | EX. 15 | EX. 16 | EX. 17 | EX. 18 | EX. 19 | EX. 20 |
|---|---|---|---|---|---|---|---|
| Epoxy Resin Type/pbw[1] | I/144 VII/54 | II/153.3 VII/54 | III/161.9 VII/54 | IV/170 VII/54 | VII/192.7 VII/54 | IV/144.8 VII/54 | III/130 VII/54 |
| Curing Agent Type/pbw | A/40.8 | A/37.1 | A/32.6 | A/30.4 | A/21.3 | A/40.5 | None |
| Gloss Control Additive Type/pbw | A/61.2 | A/55.6 | A/51.5 | A/45.6 | A/32 | A/60.7 | C/116 |
| Equiv. Ratio[5] | 0.988:1 | 0.977:1 | 0.998:1 | 0.976:1 | 0.97:1 | 0.978:1 | 0.998:1 |
| E/C/G[6] | .988/.5/.5 | .977/.5/.5 | .988/.5/.5 | .976/.5/.5 | .97/.5/.5 | .978/.5/.5 | .988/0/1 |
| 2-methyl-imidalole, pbw | 0.9 | 0.9 | 0.9 | 0.9 | 0.9 | 0.9 | 0.9 |
| $TiO_2$, pbw | 150 | 150 | 150 | 150 | 150 | 150 | 150 |
| Gel Time[4], sec. | 67.5 | 75.1 | 73.1 | 59.2 | 73.9 | 65.7 | 78.6 |
| Gloss Retention % @ 20°/% @ 60° | 3/7 | 3/11 | 3/27 | 3/15 | 5/29 | 4/23 | 2/5 |
| Yellowness Index | 4.6 | 3.0 | 2.7 | 5.5 | 3.5 | 5.8 | 8.5 |
| MEK Resistance No. of Double Rubs | 20 | 20 | 20 | 20 | 20 | 20 | 35 |
| 30 Min. Water Boil Resist. | N.D. | N.D. | N.D. | N.D. | N.D. | N.D. | N.D. |
| Reverse Impact Inch-Pounds | p120 | p100 | p130 | p100 | p140 | p120 | p20 |

| FORMULATION | EXAMPLE OR COMPARATIVE EXPERIMENT NUMBER | | | | | | |
|---|---|---|---|---|---|---|---|
| | EX. 21 | EX. 22 | EX. 23 | EX. 24 | EX. 25 | EX. 26 | EX. 27 |
| Epoxy Resin Type/pbw[1] | III/143.6 VII/54 | III/147.8 VII/54 | III/157.7 VII/54 | III/168.3 VII/54 | III/155.39 VII/54 | III/161.91 VII/54 | III/163.83 VII/54 |
| Curing Agent Type/pbw | None | None | None | None | A/38.28 | A/39.19 | A/39.46 |
| Gloss Control Additive Type/pbw | D/102.4 | E/98.2 | F/88.3 | G/77.7 | C/52.33 | D/44.9 | E/42.71 |
| Equiv. Ratio[5] | 0.999:1 | 0:1 | 1:1 | 1:1 | 1:1 | 1:1 | 1:1 |
| E/C/G[6] | .999/0/1 | 1/0/1 | 1/0/1 | 1/0/1 | 1/.6/.4 | 1/.597/.403 | |
| 2-methyl-imidalole, pbw | 0.9 | 0.9 | 0.9 | 0.9 | 0.9 | 0.9 | 0.9 |
| $TiO_2$, pbw | 150 | 150 | 150 | 150 | 150 | 150 | 150 |
| Gel Time[4], sec. | 73.5 | 75 | 76.4 | 108.5 | 65.6 | 64.4 | 65.9 |
| Gloss Retention % @ 20°/% @ 60° | 2/9 | 3/6 | 3/11 | 3/7 | 3/14 | 3/16 | 3/20 |
| Yellowness Index | 11 | 10.3 | 10.3 | 13.5 | 7.6 | 4.8 | 6.4 |
| MEK Resistance No. of Double Rubs | 50 | 60 | 60 | 80 | 100 | 100 | 120 |
| 30 Mi,. Water Boil. Resist. | N.D. | N.D. | N.D. | N.D. | N.D. | N.D. | N.D. |
| Reverse Impact Inch-Pounds | p20 | p5 | p10 | f5[7] | p140 | p140 | p140 |

| FORMULATION | EXAMPLE OR COMPARATIVE EXPERIMENT NUMBER | | | | | |
|---|---|---|---|---|---|---|
| | EX. 28 | EX. 29 | EX. 30 | EX. 31 | EX. 32 | EX. 33 |
| Epoxy Resin Type/pbw[1] | III/168.32 VII/54 | III/172.88 VII/54 | VI/135.85 VII/54 | VI/143.13 VII/54 | VI/145.31 VII/54 | VI/150.45 VII/54 |
| Curing Agent Type/pbw | A/40.8 | A/40.72 | A/44 | A/45.48 | A/45.91 | A/46.95 |
| Gloss Control Additive Type/pbw | F/37.6 | G/32.4 | C/66.15 | D/57.39 | E/54.78 | F/48.60 |
| Equiv. Ratio[5] | 1:1 | 1:1 | 0.997:1 | 0.997:1 | 0,.997:1 | 0.997:1 |
| E/C/G[6] | 1/.594/.406 | 1/.592/.408 | .997/.58.42 | .997/.573/.427 | .997/.574/.426 | .997/.57/.43 |
| 2-methyl-imidalole, pbw | 0.9 | 0.9 | 0.9 | 0.9 | 0.9 | 0.9 |
| $TiO_2$, pbw | 150 | 150 | 150 | 150 | 150 | 150 |
| Gel Time[4], sec. | 70.8 | 74.7 | 49.6 | 55.7 | 55.3 | 69.7 |
| Gloss Retention % @ 20°/% @ 60° | 3/11 | 2/12 | 2/13 | 3/14 | 3/14 | 3/14 |
| Yellowness Index | 4.5 | 4.7 | 7.2 | 4.6 | 5.7 | 7.3 |
| MEK Resistance No. of Double Rubs | 60 | 80 | 100 | 50 | 80 | 80 |
| 30 Min. Water Boil Resist. | N.D. | N.D. | N.D. | N.D. | N.D. | N.D. |
| Reverse Impact Inch-Pounds | p140 | p140 | p120 | p120 | p40 | p100 |

| FORMULATION | EXAMPLE OR COMPARATIVE EXPERIMENT NUMBER | | | | | |
|---|---|---|---|---|---|---|
| | EX. 34 | EX. 35 | EX. 36 | EX. 37 | EX. 38 | EX. 39 |
| Epoxy Resin Type/pbw[1] | VI/155.76 | III/114 | III/169.6 | III/160.8 | III/129.6 | III/164.8 |

-continued

|  | VII/54 | VII/54 | VII/54 | VII/54 | VII/54 | VII/54 |
|---|---|---|---|---|---|---|
| Curing Agent Type/pbw | A/48.03 | A/35 | A/33.9 | A/32.6 | A/27.9 | A/33.1 |
| Gloss Control Additive Type/pbw | G/42.21 | H/97 | I/42.5 | J/52.6 | K/88.5 | L/48.1 |
| Equiv. Ratio[5] | 0.997:1 | 0.994:1 | 0.999:1 | 1:1 | 1:1 | 1:1 |
| E/C/G[6] | .997/.568/.432 | .994/.681/.319 | .999/.5/.5 | 1/.5/.5 | 1/.5/.5 |  |
| 2-methyl-imidalole, pbw | 0.9 | 0.9 | 0.9 | 0.9 | 0.9 | 0.9 |
| $TiO_2$, pbw | 150 | 150 | 150 | 150 | 150 | 150 |
| Gel Time[4], sec. | 71.2 | 47.4 | 58.6 | 68.3 | 56.8 | 63.2 |
| Gloss Retention % @ 20°/% @ 60° | 2/8 | 3/9 | 2.5/8 | 2.5/9 | 3/6 | 3/15 |
| Yellowness Index | 7.9 | 4.7 | 7.2 | 6.7 | 6.7 | 4.7 |
| MEK Resistance No. of Double Rubs | 80 | 130 | 80 | 60 | 80 | 100 |
| 30 Min. Water Boil Resist. | N.D. | N.D. | N.D. | N.D. | N.D. | N.D. |
| Reverse Impact Inch-Pounds | p80 | f10[7] | p100 | p120 | f5[7] | p140 |

|  | FORMULATION | EX. 40 | EX. 41 | EX. 42 | EX. 43 | EX. 44 |
|---|---|---|---|---|---|---|
|  | Epoxy Resin Type/pbw[1] | III/54.53 VII/18 | III/54.53 VII/18 | III/54.53 VII/18 | VI/48.67 VII/18 | VI/48.67 VII/18 |
|  | Curing Agent Type/pbw | A/10.97 | A/10.97 | A/10.97 | A/13.33 | A/13.33 |
|  | Gloss Control Additive Type/pbw | A/16.5 | A/16.5 | A/16/5 | A/20 | A/20 |
|  | Equiv. Ratio[5] | 1:1 | 1:1 | 1:1 | 1:1 | 1:1 |
|  | E/C/G[6] | 1/.5/.5 | 1/.5/.5 | 1/.5/.5 | 1/.5/.5 | 1/.5/.5 |
|  | 2-methyl-imidalole, pbw | 0.2 | 0.4 | 0.6 | 0.2 | 0.4 |
|  | $TiO_2$, pbw | 50 | 50 | 50 | 50 | 50 |
|  | Gel Time[4], sec. | 88.5 | 47.7 | 34.7 | 89.4 | 38.4 |
|  | Gloss Retention % @ 20°/% @ 60° | 3/13 | 3/24 | 4/22 | 2/12 | 3/19 |
|  | Yellowness Index | 6.4 | 5.2 | 4.9 | 6.3 | 8.6 |
|  | MEK Resistance No. of Double Rubs | 100 | 180 | 160 | 100 | 120 |
|  | 30 Min. Water Boil Resist. | N.D. | N.D. | N.D. | N.D. | N.D. |
|  | Reverse Impact Inch-Pounds | p140 | p140 | p160 | p140 | p120 |

Footnotes for Table
[1] pbw = parts by weight.
[2] N.D. = not determined.
[3] p = passed
[4] Gel time is the time required for gellation as determined by mixing about one gram sample of powder formulation with a narrow wooden or metal spatula on a hot plate platen set at 175° C. until the material does not pick up with the spatula or becomes "tack free".
[5] Equiv. Ratio is the number of epoxy groups per number of groups reactive with an epoxy group obtained from both the curing agent and the gloss control additive.
[6] E/C/G = Ratio of equivalents of epoxy/equivalents curing agent/equivalents of gloss control additive.
[7] f = failed.

I claim:

1. In a powder coating containing a solid curable epoxy resin containing more than one vicinal epoxy group and a curing agent therefor selected from the group consisting of (1) substituted guanidines, (2) derivatives of biguanides, (3) aliphatic amines, (4) aromatic amines, (5) compounds having an average of more than one phenolic hydroxyl group per molecule and which are free of (a) sulfone groups and (b) fused rings, (6) polycarboxylic acids, (7) halogenated anhydrides, (8) non-halogenated anhydrides, and (9) mixtures thereof; the improvement which comprises employing as at least a part of said curing agent, a polymer prepared only from ethylene and acrylic acid as monomers, said polymer having a melt index of from about 30 to about 40,825 in a sufficient quantity so as to lower the 60° gloss of the coating when cured.

2. A powder coating of claim 1 wherein (1) the epoxy resin contains an average of more than one glycidyl ether group and (2) the curing agent contains (a) a material containing a plurality of phenolic hydroxyl groups which are free of sulfone groups and fused rings and (b) said polymer has a melt index of from about 250 to about 2000.

3. A powder coating of claim 1 wherein (1) the epoxy resin contains an average of more than one glycidyl ether group and (2) the curing agent contains (a) a material containing a plurality of carboxylic acid groups and (b) a polymer prepared from ethylene and acrylic acid having a melt index of from about 250 to about 2000.

4. A powder coating of claim 3 wherein component (a) is a carboxylic acid functional polymer prepared from the esterification of compounds containing a plurality of hydroxyl groups and compounds containing a plurality of carboxylic acid groups or an anhydride thereof.

5. A powder coating of claim 4 wherein component (a) is prepared from a glycol or a polyoxyalkylene glycol and a dicarboxylic acid or anhydride thereof.

6. A powder coating of claim 1 wherein (1) the epoxy resin contains an average of more than one glycidyl ether group and (2) the curing agent contains (a) a substituted guanidine and (b) a polymer prepared from ethylene and acrylic acid having a melt index of from about 250 to about 2000.

7. A powder coating of claim 1 wherein all of the curing agent is replaced with said polymer on an equivalent basis.

8. A powder coating of claim 7 wherein (1) the epoxy resin contains an average of more than one glycidyl ether group and (2) said polymers has a melt index of from about 250 to about 2000.

9. A powder coating composition comprising
(A) at least one solid epoxy resin or a mixture of epoxy resins which mixture is a solid;
(B) a material containing more than one phenolic hydroxyl group and is free of sulfone groups and fused rings;
(C) a sufficient quantity of a polymer prepared only from ethylene and acrylic acid as monomers, said polymer having a melt index of from about 30 to about 40,825; and
(D) a catalyst or accelerator for the reaction of component (A) with components (B) or (C) or both; wherein component (A), (B) and (C) are present in quantities which provides a ratio of the equivalents of component (A) to the equivalents of component (B) plus (C) of from about 0.8 to about 1.2.

10. A powder coating of claim 9 wherein (1) component (A) contains an average of more than one glycidyl ether group per molecule; (2) component B contains bisphenol A residues; (3) component (C) has a melt index of from about 250 to about 2,000; and (4) the ratio of the number of equivalents of component (A) to the number of equivalents of components (B) plus (C) is from about 0.9 to about 1.1.

11. A powder coating of claims 1, 2, 3, 4, 5, 6, 7, 8, 9, or 10 wherein the solid curable epoxy resin is that represented by Formulas I or II or mixtures of two or more of such resins wherein A is independently a divalent hydrocarbyl group having from 1 to about 8 carbon atoms, —S—, —S—S—, —O—,

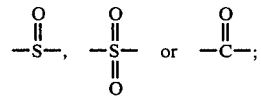

each n independently has a value of zero or 1; n' has a value such that the epoxy resin is a solid at 25° C.; each A' is independently a divalent hydrocarbyl group having from 1 to about 6 carbon atoms; each X and X' is independently hydrogen, a halogen atom or a hydrocarbyl group having from 1 to about 9 carbon atoms and m has a value such that the epoxy resin is a solid at 25° C.

12. A powder coating of claim 11 wherein in the Formulas I and II, A is an isopropylidine group; each X and X' is independently hydrogen or bromine; each n has a value of 1; and A' is a —CH₂— group.

* * * * *